(12) United States Patent
Wang

(10) Patent No.: US 9,877,303 B2
(45) Date of Patent: Jan. 23, 2018

(54) METHOD FOR PROCESSING MULTIMEDIA BROADCAST/MULTICAST SERVICE SESSION UPDATE

(75) Inventor: He Wang, Shanghai (CN)

(73) Assignee: Alcatel Lucent, Boulogne-Billancourt (FR)

(*) Notice: Subject to any disclaimer, the term of this patent is extended or adjusted under 35 U.S.C. 154(b) by 283 days.

(21) Appl. No.: 13/578,326

(22) PCT Filed: Feb. 12, 2010

(86) PCT No.: PCT/CN2010/000203
§ 371 (c)(1),
(2), (4) Date: Aug. 10, 2012

(87) PCT Pub. No.: WO2011/097763
PCT Pub. Date: Aug. 18, 2011

(65) Prior Publication Data
US 2012/0307707 A1    Dec. 6, 2012

(51) Int. Cl.
*H04W 72/00* (2009.01)
*H04W 4/06* (2009.01)
*H04L 12/18* (2006.01)

(52) U.S. Cl.
CPC ......... *H04W 72/005* (2013.01); *H04L 12/189* (2013.01); *H04W 4/06* (2013.01)

(58) Field of Classification Search
CPC ... H04W 4/06; H04W 72/005; H04W 76/002; H04W 76/02; H04W 36/0011;
(Continued)

(56) References Cited

U.S. PATENT DOCUMENTS 8,184,570 B2 * 5/2012 Chun et al. .................... 370/312
8,208,442 B2 * 6/2012 Mandi et al. ................. 370/331
(Continued)

FOREIGN PATENT DOCUMENTS

CN    101272592 A    9/2008
CN    101299828 A    11/2008
(Continued)

OTHER PUBLICATIONS

Alcatel-Lucent Shanghai Bell, Alcatel-Lucent, CMCC, "MBMS Session Update in M3AP stage 2", 3GPP, TSG-RAN WG3 Meeting #66bis R3-100168, Jan. 18-22, 2010, pp. 1-4.*
(Continued)

*Primary Examiner* — Paul H. Masur
*Assistant Examiner* — Michael Phillips
(74) *Attorney, Agent, or Firm* — Fay Sharpe, LLP

(57) ABSTRACT

There is provided a method for processing Multimedia Broadcast/Multicast Service MBMS session update in M3 and M2 interfaces in a wireless communication system, the wireless communication system comprising a Mobility Management Entity MME, a Multi-cell/Multicast Coordination Entity MCE and an eNB, the method comprising: sending, by the MME, a first MBMS session update request message to the MCE; processing, by the MCE, the first MBMS session update request message, and sending, a second MBMS session update request message to the eNB and sending a first feedback message to the MME; processing, by the eNB, the second MBMS session update request message, and sending a second feedback message to the MCE.

The present invention enables a RAN and an EPC to consistently process the MBMS session update procedure.
(Continued)

Thus, the present invention may avoid misunderstanding caused by signaling processing from the EPC to EUTRAN in a radio access network.

23 Claims, 3 Drawing Sheets

(58) Field of Classification Search
CPC . H04W 36/0022; H04W 76/04; H04W 88/16; H04L 12/18; H04L 65/4076; H04L 12/189; H04L 67/14
USPC ............... 370/216, 254, 276, 312, 328, 389
See application file for complete search history.

(56) References Cited

U.S. PATENT DOCUMENTS

| | | | |
|---|---|---|---|
| 2006/0171369 A1* | 8/2006 | Ostrup ................ | H04L 12/1886 370/349 |
| 2009/0180417 A1* | 7/2009 | Frost ................... | H04W 72/005 370/312 |
| 2009/0190518 A1* | 7/2009 | Kim ..................... | H04L 12/189 370/312 |
| 2010/0110961 A1 | 5/2010 | Chao et al. | |
| 2010/0205499 A1* | 8/2010 | Axelsson .............. | H04L 1/1614 714/748 |
| 2010/0208641 A1* | 8/2010 | Guo .............................. | 370/312 |
| 2010/0254352 A1* | 10/2010 | Wang et al. .................. | 370/332 |
| 2010/0265866 A1* | 10/2010 | Chao et al. ................... | 370/312 |
| 2010/0265867 A1* | 10/2010 | Becker et al. ................ | 370/312 |
| 2011/0116433 A1* | 5/2011 | Dorenbosch ........ | H04W 72/005 370/312 |
| 2012/0300688 A1* | 11/2012 | Gholmieh et al. ........... | 370/312 |

FOREIGN PATENT DOCUMENTS

| | | | |
|---|---|---|---|
| EP | 2109263 | A1 | 10/2009 |
| WO | 2006/083207 | A1 | 8/2006 |
| WO | WO/2008/131612 | * | 6/2008 |
| WO | WO 2008/084911 | A1 | 7/2008 |
| WO | 2008/113263 | A1 | 9/2008 |
| WO | 2009019201 | A2 | 2/2009 |
| WO | WO/2009/152773 | * | 12/2009 |

OTHER PUBLICATIONS

Nec et al., "Response to R3092321 (further draft details for 36.444)", Oct. 12-15, 2009, 3GPP-TSG-RAN WG3 #65bis, Miyazaki, Japan, R3-092562.*
CMCC et al., "Discussion on eMBMS C-Plane Synchronization", Oct. 12-16 2009, 3GPP TSG-RAN WG3 Meeting #65bis, R3-092200.*
Huawei, "Session Update Procedure in LTE MBMS"; Feb. 11-15, 2008, 3GPP TSG RAN WG3 Meeting #59, Sorrento, Italy, R3-080243.*
Guo, WO/2009/152773, Dec. 2009, WO, machine translation.*
Guo, WO/2008/131612, Jun. 2008, WO, machine translation.*
China Mobile, "Clarify the usage of Access-indicator in Session Update procedure", Jan. 18-22, 2010, 3GPP, 3GPP TSG SA WG2 Meeting #77, Shenzhen, China, S2-100293.*
3GPP, "CRs (Rel-6 Category B) for the introduction of MBMS in RAN3 specifications", Dec. 8-10, 2004, 3GPP, TSG RAN Meeting #26 Vouliagmeni Athens, Greece, RP-040437, pp. 1-20, 106-108, 120-121.*
Of Huawei, "MCCH generation and repetition", Aug. 24-28, 2009, 3GPP, 3GPP TSG-RAN WG3 #65, Shenzhen, China, R3-091747.*
Alcatel-Lucent Shanghai Bell, Alcatel-Lucent, CMCC, "Issues of MBMS Session Update for M3AP and M2AP," 3GPP TSG-RAN WG3 #66bis, R3-100166, pp. 1-2, Valencia, Spain, Jan. 18-22 2010.
"3$^{rd}$ Generation Partnership Project: Technical Specification Group Services and Architecture; Multimedia Broadcast/Multicast Service (MBMS): Architecture and functional description (Release 9)," 3GPP TS 23.246, V9.3.0, pp. 1-65, Dec. 2009.
International Search Report for PCT/CN2010/000203 dated Jun. 17, 2010.
English Bibliography for PCT Patent Application Publication No. WO 2008/113263 A1, published Sep. 25, 2008, printed from Thomson Innovation on Jul. 31, 2014, 4pp.
R3-090581, Change Request 25.413 CR 0979, 3GPP TSG-RAN3 Meeting #63, Change Request sheet and p. 88 of 380 from Rev. 1 to TS 25.413, version 8.1.0., Athens, Greece, Feb. 9-13, 2009, 2 pp.
R3-092901, Closing some M3 open issues, 3GPP TSG-RAN WG3 Meeting #66, Nov. 9-13, 2009, Jeju, Korea, 4 pp.
European Pat. App. No. 10845437, Extended European Search Report, dated Mar. 15, 2016, 9 pp.

* cited by examiner

METHOD FOR PROCESSING MULTIMEDIA BROADCAST/MULTICAST SERVICE SESSION UPDATE

FIELD OF THE INVENTION

The present invention relates to wireless communications, and specifically relates to a method for updating a Multimedia Broadcast/Multicast Service (MBMS) session.

BACKGROUND OF THE INVENTION

At present, according to the conclusion of Service and System Aspects 2 (SA2) Workgroup, an ongoing MBMS session may change some service characteristics, for example, Service Area. An Evolved Packet Core (EPC) network defines an MBMS Session Update procedure. However, in a radio access network (RAN), there is no corresponding procedure definition especially in M3 (an interface between a Mobility Management Entity MME and a Multi-cell/Multicast Coordination Entity MCE) and M2 (an interface between the MCE and an eNB) interfaces. Upon receiving an MBMS Session Update Request message from a Broadcast/Multicast Service Center (BMSC), an MBMS gateway sends different messages to the MME based on different results of comparison between an updated control node list included in itself and the updated control node list included in the MBMS Session Update Request message, wherein the different messages may be MBMS Session Start Request, MBMS Session Stop request, and MBMS Session Update Request. The MME needs to send these messages to its corresponding MCE. Therefore, in the M3 and M2 interfaces, processing of the MBMS Session Update procedure needs to be defined. The processing comprises a new M3 application protocol (M3AP) and M2 application protocol (M2AP) signaling flow definition for the MBMS Session Update procedure, and a relevant processing mechanism for MBMS Session Update signaling of the M3AP and M2AP in the MCE and eNB.

SUMMARY OF THE INVENTION

Therefore, in order to solve the above problem, the present invention provides a method for processing MBMS session update.

According to one aspect of the present invention, there is provided a method for processing Multimedia Broadcast/Multicast Service MBMS session update, comprising: sending, by a Mobility Management Entity MME, a first MBMS session update request message to a Multi-cell/Multicast Coordination Entity MCE; processing, by the MCE, the first MBMS session update request message, and sending, a second MBMS session update request message to an eNB and sending a first feedback message to the MME; and processing, by the eNB, the second MBMS session update request message, and sending a second feedback message to the MCE.

Preferably, the processing, by the MCE, the first MBMS session update request message comprises: decoding the first MBMS session update request message, and storing session attribute update obtained by the decoding in an MBMS bearer context.

Preferably, the processing, by the eNB, the second MBMS session update request message comprises: decoding the second MBMS session update request message, comparing a service area already stored in an MBMS bearer context with a new service area, and performing corresponding update.

Preferably, after the MCE correctly processes the first MBMS session update request message, the MCE immediately sends a first MBMS session update response message to the MME.

Preferably, after the MCE receives a second MBMS session update response message from the eNB, the MCE sends a first MBMS session update response message to the MME.

Preferably, if the MCE fails to correctly process the received first MBMS session update request message, the MCE sends a first MBMS session update failure message to the MME. Further preferably, if the MCE sends the first MBMS session update failure message to the MME, the MME re-sends the first MBMS session update request message to the MCE.

Preferably, after the eNB correctly processes the second MBMS session update request message, the eNB sends a second MBMS session update response message to the MCE.

Preferably, if the eNB fails to correctly process the second MBMS session update request message, the eNB sends a second MBMS session update failure message to the MCE. Further preferably, if the eNB sends the second MBMS session update failure message to the MCE, the MCE re-sends the second MBMS session update request message to the eNB.

The present invention enables the RAN and EPC to consistently process the MBMS session update procedure. Thus, the present invention may avoid misunderstanding caused by signaling processing (i.e., MBMS session update request message) from the EPC to EUTRAN in the radio access network.

BRIEF DESCRIPTION OF THE DRAWINGS

The above and other features of the present invention will become more apparent through the following detailed description with reference to the drawings, wherein.

DETAILED DESCRIPTION OF EMBODIMENTS

Figure 1:
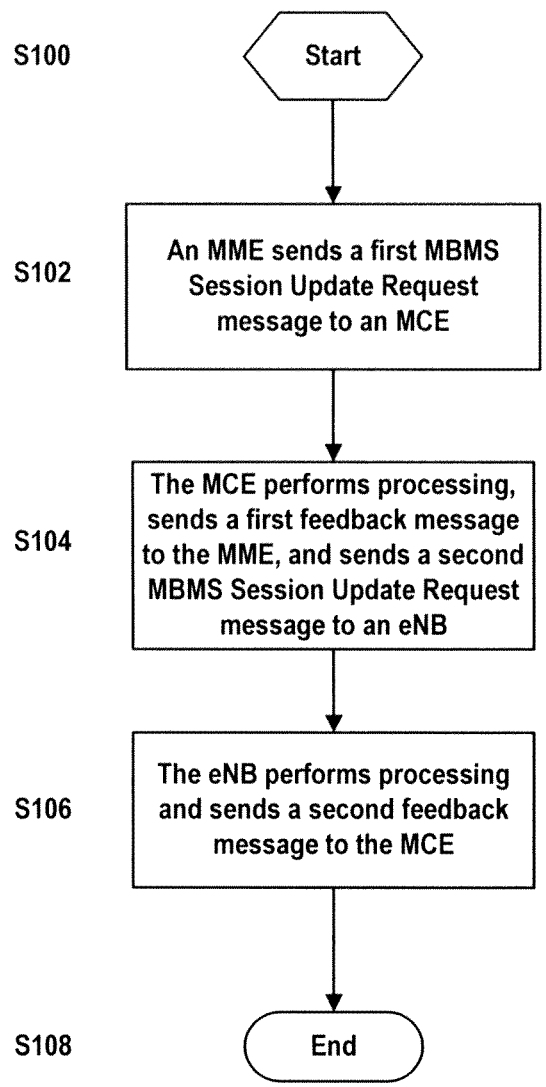
FIG. 1 illustrates a flow chart of a method for processing MBMS Session Update on the M3 and M2 interfaces according to one embodiment of the present invention.

Hereinafter, through the description of specific embodiments of the present invention with reference to the drawings, the principle and implementation of the present invention will become more apparent. It should be noted that the present invention is not limited to the following specific embodiments. It should be further noted that for the sake of simplicity, those known components directly related to the present invention are not illustrated in the drawings.

In TS23.246, a MBMS Session Update procedure is defined for updating the Service Area for an ongoing MBMS broadcast service session by a BMSC. In section 8.8.4 of TS23.246, a detailed MBMS Session Update signaling procedure is described. This procedure is initiated by the BMSC, for modifying Service Area attributes and notifying related eNBs to join or leave the Service Area. Considering the existence of such possibility as changing the service area during the ongoing session, it is reasonable for SA2 to define such a procedure. However, it does not involve an interface signaling definition inside a radio access network and a processing procedure of related network elements.

There are three cases in which MBMS control plane nodes are changed due to change of Service Area (SA), which are:

Case 1: some new MMEs are added into a MBMS control plane node list due to the change of SA;

Case 2: it is required to remove some MMEs from the MBMS control plane node list due to the change of SA;

Case 3: the MMEs in the MBMS control plane node list do not change, but the cells under these MMEs may change due to the change of SA.

In view of the above three cases caused by the change of SA, once the MBMS gateway receives Session Update Request signaling from the BMSC, it compares a new MBMS control plane node list with the MBMS control plane node list already stored in an MBMS bearer context, and decides which case occurs. According to the description in TS23.246, the MBMS gateway sends different signaling to corresponding MMEs based on different cases caused by the change of SA, that is, for case 1, the MBMS gateway sends an MBMS Session Start Request message to any added MME in the new list;

for case 2, the MBMS gateway sends an MBS Session Stop Request message to any MME removed from the new list;

for case 3, the MBMS gateway sends an MBMS Session Update Request (Temporary Mobile Group Identity (TMGI), flow identifier, QoS, MBMS Service Area, session identifier, estimated session duration, transport network IP Multicast Address, IP address of a multicast source, and Common Tunnel End Identifier (C-TEID), etc.) to the remaining MMEs in the new list.

The MME receives the Session Start Request message and the Session Stop Request message, and operates as usual, such as, creates or updates the MBMS bearer context and session attributes. Then, the MME notifies the related MCE by sending M3AP Session Start Request and Session Stop Request signaling. In this procedure, all processing on related network nodes are consistent with the existing processing mechanisms for the MBMS Session Start Request and the MBMS Session Stop Request.

Hereinafter, the processing of a MBMS Session Update Request within a radio access network (RAN) will be described in detail with reference to FIGS. 1-3.

FIG. 1 illustrates a flow chart of a method for performing a MBMS Session Update procedure on the M3 and M2 interfaces according to one embodiment of the present invention. Method 10 starts at step S100. In the M3 interface, firstly, it is required to define a Class 1 elementary procedure MBMS Session Update Request message for the MBMS session, as specified in the following table:

TABLE 1

Class 1 Procedure for MBMS Session Update for M3 interface

| Elementary Procedure | Initial Message | Successful Outcome Response Message | Unsuccessful Outcome Response Message |
|---|---|---|---|
| MBMS Session Update | MBMS Session Update Request | MBMS Session Update Response | MBMS Session Update Failure |

In step S102, the MME sends a first MBMS Session Update Request message to the MCE on the M3 interface. This message is used for notifying the MCE of the changed characteristics (for example, the service area) of the ongoing service session, and requests the MCE to update its parameters. The first MBMS Session Update Request is specifically defined below:

TABLE 2

Detailed Definition of MBMS Session Update Request Message for M3 Interface

| IE/Group Name | Presence | Range | IE Type and Reference | Semantics Description | Criticality | Assigned Criticality |
|---|---|---|---|---|---|---|
| Message type | M | | 9.2.1.1 | | Yes | Reject |
| MME MBMS M3AP ID | M | | 9.2.3.2 | | Yes | Reject |
| TMGI | M | | 9.2.3.3 | | Yes | Reject |
| MBMS Session Identity | O | | 9.2.3.4 | | Yes | Ignore |
| MBMS E-RAB QoS Parameters | M | | 9.2.1.3 | | Yes | Reject |
| MBMS Session Duration | M | | 9.2.3.5 | | Yes | Reject |
| MBMS Service Area | O | | 9.2.3.6 | | Yes | Ignore |
| Minimum Waiting Time for MBMS Data Transfer | M | | 9.2.3.8 | | Yes | Reject |
| TNL Information | M | | | | Yes | Reject |
| >IP Multicast Address | M | | 9.2.2.1 | | — | |
| >GTP DL TEID | M | | GTP TEID 9.2.2.2 | | — | |

Note:
the content in the row of "IE Type and Reference" in the table corresponds to TS36.444 V.9.0.0.

In step 104, the MCE processes the first MBMS Session Update Request message, sends a first feedback message to the MME, and sends a second MBMS Session Update Request message to the eNB on the M2 interface. Specifically, the MCE updates its own parameters in the session by utilizing the information in the first MBMS Session Update Request message, for example, the QoS parameter, the Service Area parameter, etc., stores new session attribute update in the MBMS bearer context, and compares the original Service Area with new Service Area. Thereafter, the MCE sends the first feedback message to the MME on the M3 interface and sends the second MBMS Session Update Request message including the new session attributes to each eNB connected thereto on the M2 interface.

Depending on the processing result of the MCE, the first feedback message may be a first MBMS Session Update Response message or a first MBMS Session Update Failure message. The first MBMS Session Update Response message is used for reporting the successful outcome of the first MBMS Session Update Request message, while the first MBMS Session Update Failure message is used for reporting the unsuccessful outcome of the first MBMS Session Update Request message. Definitions for both messages are provided below:

TABLE 3

Detailed Definition of MBMS Session Update
Response Message for M3 Interface

| IE/Group Name | Presence | Range | IE Type and Reference | Semantics Description | Criticality | Assigned Criticality |
|---|---|---|---|---|---|---|
| Message Type | M | | 9.2.1.1 | | Yes | Reject |
| MME MBMS M3AP ID | M | | 9.2.3.2 | | Yes | Reject |
| MCE MBMS M3AP ID | M | | 9.2.3.1 | | Yes | Reject |
| Criticality Diagnostics | O | | 9.2.1.7 | | Yes | Ignore |

Note:
the content in the row of "IE Type and Reference" in the table corresponds to TS36.444 V.9.0.0.

TABLE 4

Detailed Definition of MBMS Session Update
Failure Message for M3 Interface

| IE/Group Name | Presence | Range | IE Type and Reference | Semantics Description | Criticality | Assigned Criticality |
|---|---|---|---|---|---|---|
| Message Type | M | | 9.2.1.1 | | Yes | Reject |
| MME MBMS M3AP ID | M | | 9.2.3.2 | | Yes | Reject |
| Cause | M | | 9.2.1.2 | | Yes | Ignore |
| Criticality Diagnostics | O | | 9.2.1.7 | | Yes | Ignore |

Note:
the content in the row of "IE Type and Reference" in the table corresponds to TS36.444 V.9.0.0.

Likewise, the Class 1 elementary procedure MBMS Session Update Request message is also defined for MBMS session update in the M2 interface, as specified in the following table:

TABLE 5

Class 1 Procedure defined for MBMS
Session Update for M2 interface

| Elementary Procedure | Initial Message | Successful Outcome Response Message | Unsuccessful Outcome Response Message |
|---|---|---|---|
| MBMS Session Update | MBMS Session Update Request | MBMS Session Update Response | MBMS Session Update Failure |

The second MBMS Session Update Request is specifically defined as follows:

TABLE 6

Detailed Definition of MBMS Session Update
Request Message for M2 Interface

| IE/Group Name | Presence | Range | IE Type and Reference | Semantics Description | Criticality | Assigned Criticality |
|---|---|---|---|---|---|---|
| Message Type | M | | 9.2.1.1 | | Yes | Reject |
| MCE MBMS M2AP ID | M | | 9.2.3.1 | | Yes | Reject |
| TMGI | M | | 9.2.3.3 | | Yes | Reject |
| MBMS Session Identity | O | | 9.2.3.4 | | Yes | Ignore |
| MBMS Session Duration | M | | 9.2.3.5 | | Yes | Reject |
| MBMS Service Area | O | | 9.2.3.6 | | Yes | Ignore |
| TNL Information | M | | | | Yes | Reject |
| >IP Multicast Address | M | | 9.2.2.1 | | — | |
| >GTP DL TEID | M | | GTP TEID 9.2.2.2 | | — | |

Note:
the content in the row of "IE Type and Reference" in the table corresponds to TS36.443 V.9.0.0.

In step S106, the eNB processes the second MBMS Session Update Request message and sends a second feedback message to the MCE. Specifically, the eNB processes the second MBMS Session Update Request message, compares the Service Area stored in the MBMS bearer context with new Service Area, and performs corresponding update. In addition, the eNB sends the second feedback message to the MCE on the M2 interface.

Likewise, depending on the processing result of the eNB, the second feedback message may be a second MBMS Session Update Response message or a second MBMS Session Update Failure message. The second MBMS Session Update Response message is used for reporting the successful outcome of the second MBMS Session Update Request message, while the second MBMS Session Update Failure message is used for reporting the unsuccessful outcome of the second MBMS Session Update Request message. Definitions for both messages are specified below:

TABLE 7

Detailed Definition of MBMS Session Update
Response Message for M2 Interface

| IE/Group Name | Presence | Range | IE Type and Reference | Semantics Description | Criticality | Assigned Criticality |
|---|---|---|---|---|---|---|
| Message Type | M | | 9.2.1.1 | | Yes | Reject |
| MCE MBMS M2AP ID | M | | 9.2.3.1 | | Yes | Reject |
| eNB MBMS M2AP ID | M | | 9.2.3.2 | | Yes | Reject |
| Criticality Diagnostics | O | | 9.2.1.7 | | Yes | Ignore |

Note:
the content in the row of "IE Type and Reference" in the table corresponds to TS36.443 V.9.0.0.

TABLE 8

Detailed Definition of MBMS Session Update
Failure Message for M2 Interface

| IE/Group Name | Presence | Range | IE Type and Reference | Semantics Description | Criticality | Assigned Criticality |
|---|---|---|---|---|---|---|
| Message Type | M | | 9.2.1.1 | | Yes | Reject |
| MCE MBMS M2AP ID | M | | 9.2.3.1 | | Yes | Reject |
| Cause | M | | 9.2.1.2 | | Yes | Ignore |
| Criticality Diagnostics | O | | 9.2.1.7 | | Yes | Ignore |

Note:
the content in the row of "IE Type and Reference" in the table corresponds to TS36.443 V.9.0.0.

Finally, the method 10 ends in step S108.

After receiving a response from the eNB, the MCE reports the result of the requested MBMS Session Update to the MME. In different scenarios, the first feedback message sent from the MCE to the MME may include a plurality of cases. The MCE may immediately reply the MME to confirm reception of the MBMS Session Request after correctly receiving and decoding the MBMS Session Update Request message of the M3AP, without waiting until all related eNBs have completed processing of the second MBMS Session Update Request message and then sending the first MBMS Update Request Response message to the MME. In addition, the MCE may also send the first MBMS Update Request Response message to the MME after receiving all of the second feedback messages indicating that all related eNBs have correctly processed the second MBMS Session Update Request message. However, if the MCE determines that the radio access network is not adapted to the requested session update, the MME should be notified via the first MBMS Update Request Failure message. Alternatively, due to some reasons (for example, incorrect decoding, hardware failure, etc.), the MCE cannot correctly process the received Session Update Request, and at this point, the MCE feeds back to the MME via the first MBMS Session Update Failure message. Alternatively, the MME may consider re-sending the first MBMS Session Update Request message to those MCEs that fail in the processing.

Depending on different cases due to the change of Service Area, the eNB may need to newly join a multicast address group of the MBMS service session and send configuration information relating to the MBMS in a corresponding cell to prepare for receiving the MBMS service session; the eNB may also need to exit from the original session multicast address group of the MBMS service and stop receiving the MBMS service session; it is also possible that the eNB only requires to adjust the transmission conditions of the MBMS service in the cells under its control, including the transmission of corresponding MBMS configuration control information. In these cases, the eNB takes the second MBMS Update Request Response message as the second feedback message to feed back to the MCE. Obviously, the eNB may not correctly process the received second MBMS Session Update Request message due to several reasons (for example, incorrect decoding, some hardware error, etc.). At this point, the related eNB would take the second MBMS Session Update Failure message as the second feedback message to respond to the MCE so as to notify the MCE of the incapability of successfully processing the Session Update Request in the corresponding eNB. Alternatively, the MCE may re-send the second MBMS Session Update Request message to those eNBs that fail in the processing.

Figure 2A:
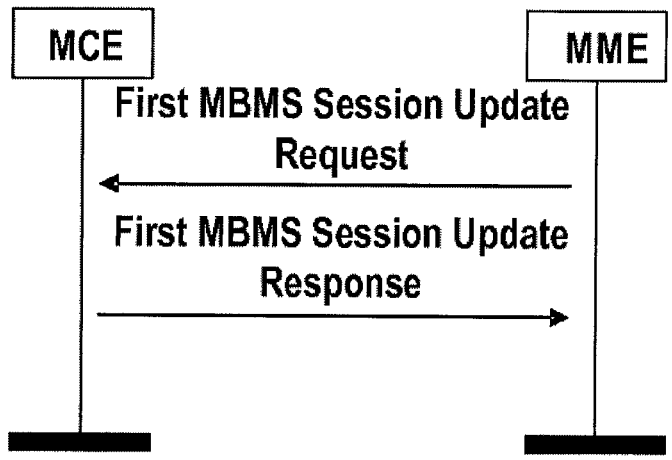
FIG. 2 illustrates a schematic diagram of an MBMS Session Update procedure between an MME and an MCE according to one embodiment of the present invention.
Figure 2B:
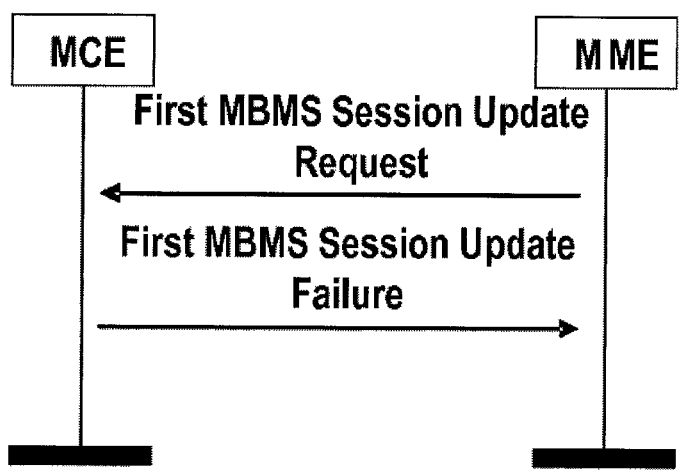

FIG. 2 illustrates a schematic diagram of an MBMS Session Update procedure between an MME and an MCE according to one embodiment of the present invention, wherein the MME communicates with the MCE via the M3 interface. FIG. 2(a) represents the case in which the MCE successfully processes the first MBMS Session Update Request message, and FIG. 2(b) represents the case in which the MCE fails to process the first MBMS Session Update Request message.

Figure 3A:
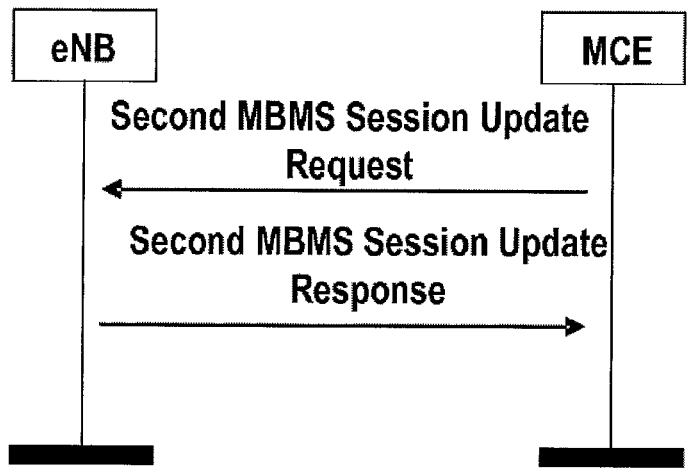
FIG. 3 illustrates a schematic diagram of an MBMS Session Update procedure between an eNB and an MCE according to one embodiment of the present invention.
Figure 3B:
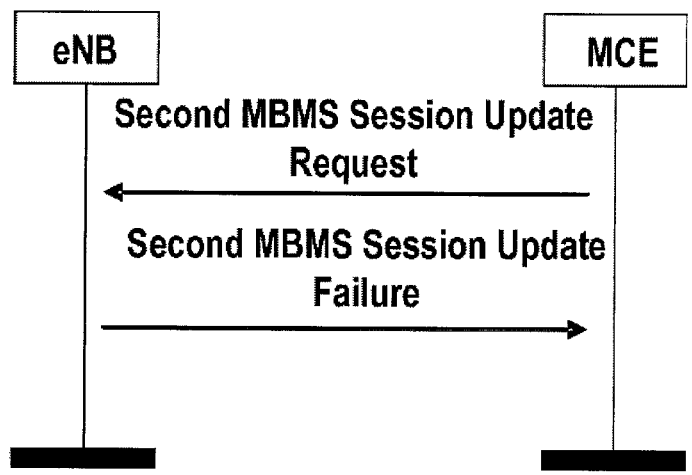

FIG. 3 illustrates a schematic diagram of an MBMS Session Update procedure between an eNB and an MCE according to one embodiment of the present invention, wherein the eNB communicates with the MCE via the M2 interface. FIG. 3(a) represents the case in which the eNB successfully processes the second MBMS Session Update Request message, and FIG. 3(b) represents the case in which the eNB fails to process the second MBMS Session Update Request message.

It should be noted that, for the sake of simplicity, FIG. 2 and FIG. 3 merely illustrate one MME and one MCE, as well as one MCE and one eNB, respectively. However, the present invention is not limited thereto. One MME may have a plurality of associated MCEs, and each MCE may have a plurality of associated eNBs. Those skilled in the art would appreciate that the above described MBMS Session Update procedure may be applied to a radio communication system having a plurality of MMEs, MCEs, and eNBs associated with each other.

Although the present invention has been illustrated above with reference to preferred embodiments of the present invention, those skilled in the art would appreciate that without departing from the spirit and scope of the present invention, the present invention may be subjected to a variety of modifications, substitutions, and change. Thus, the present invention should not be limited by the above embodiments, but should be limited by the appended claims and the equivalents thereof.

What is claimed is:

1. A method for processing a Multimedia Broadcast/Multicast Service (MBMS) session update in a radio access network (RAN), comprising:
   sending a first MBMS session update request message from a Mobility Management Entity (MME) to a Multi-cell/Multicast Coordination Entity (MCE) via an M3 interface;
   at least attempting to process the first MBMS session update request message at the MCE;
   sending a second MBMS session update request message from the MCE to a base station (eNB) via an M2 interface to provide the eNB with new session attributes based on the processing of the first MBMS session update request message;
   at least attempting to process the second MBMS session update request message at the eNB;
   sending a second feedback message from the eNB to the MCE via the M2 interface to report an outcome of the attempted processing of the second MBMS session update request message, wherein the second feedback message is a second MBMS session update response message for a successful outcome or a second MBMS session update failure message for an unsuccessful outcome; and
   sending a first feedback message from the MCE to the MME via the M3 interface to report an outcome of the attempted processing of the first MBMS session update request message and the outcome of the attempted processing of the second MBMS session update request message, wherein the first feedback message is a first MBMS session update response message for a successful outcome or a first MBMS session update failure message for an unsuccessful outcome.

2. The method according to claim 1, wherein the attempting to process at the MCE, comprises:
decoding the first MBMS session update request message; and
storing a session attribute update obtained by the decoding in an MBMS bearer context.

3. The method according to claim 1, wherein the attempting to process at the eNB, comprises:
decoding the second MBMS session update request message to obtain a new service area,
comparing an original service area stored in an MBMS bearer context with the new service area, and
performing a corresponding update based on the new service area.

4. The method according to claim 1, wherein, after the MCE correctly processes the first MBMS session update request message, the MCE sends the first MBMS session update response message for the successful outcome to the MME.

5. The method according to claim 1, wherein, after the MCE receives the second MBMS session update response message for the successful outcome from the eNB, the MCE sends the first MBMS session update response message for the successful outcome to the MME.

6. The method according to claim 1, wherein, after the MCE fails to correctly process the first MBMS session update request message due to at least one of determining the RAN is not adapted to the first MBMS session update, an incorrect decoding, and a hardware failure, the MCE sends the first MBMS session update failure message to the MME.

7. The method according to claim 6, further comprising:
after the MME receives the first MBMS session update failure message, re-sending the first MBMS session update request message from the MME to the MCE via the M3 interface.

8. The method according to claim 1, wherein, after the eNB correctly processes the second MBMS session update request message, the eNB sends the second MBMS session update response message for the successful outcome to the MCE.

9. The method according to claim 1, wherein, after the eNB fails to correctly process the second MBMS session update request message due to at least one of an incorrect decoding of the second MBMS session update request message and a hardware error at the eNB, the eNB sends the second MBMS session update failure message for the unsuccessful outcome to the MCE.

10. The method according to claim 9, further comprising:
after the MCE receives the second MBMS session update failure message, re-sending the second MBMS session update request message from the MME to the eNB via the M2 interface.

11. The method according to claim 1, wherein the first MBMS session update request message is sent by the MME in response to receiving signaling from an MBMS gateway indicating an impact to cells under the MME resulting from a change to a service characteristic for an ongoing MBMS session served by the MME.

12. The method according to claim 1, further comprising:
at least attempting to process the second feedback message at the MCE;
wherein the first feedback message sent from the MCE to the MME is based at least in part on the attempted processing of the second feedback message.

13. A method for processing a Multimedia Broadcast/Multicast Service (MBMS) session update in a radio access network (RAN), comprising:
receiving a first MBMS session update request message from a Mobility Management Entity (MME) at a Multi-cell/Multicast Coordination Entity (MCE) via an M3 interface;
at least attempting to process the first MBMS session update request message at the MCE;
sending a second MBMS session update request message from the MCE to a base station (eNB) via an M2 interface to provide the eNB with new session attributes based on the processing of the first MBMS session update request message;
at least attempting to process the second MBMS session update request message at the eNB;
sending a second feedback message from the eNB to the MCE via the M2 interface to report an outcome of the attempted processing of the second MBMS session update request message, wherein the second feedback message is a second MBMS session update response message for a successful outcome or a second MBMS session update failure message for an unsuccessful outcome; and
sending a first MBMS session update failure message from the MCE to the MME via the M3 interface after the MCE fails to correctly process the first MBMS session update request message, wherein the first MBMS session update failure message reports an unsuccessful outcome of the attempted processing of the first MBMS session update request message and the outcome of the attempted processing of the second MBMS session update request message.

14. The method according to claim 13, wherein the attempting to process at the MCE, comprises:
decoding the first MBMS session update request message; and
storing a session attribute update obtained by the decoding in an MBMS bearer context.

15. The method according to claim 13, further comprising:
after the MME receives the first MBMS session update failure message, re-sending the first MBMS session update request message from the MME to the MCE via the M3 interface.

16. The method according to claim 13, wherein, after the eNB fails to correctly process the second MBMS session update request message due to at least one of an incorrect decoding and a hardware error, the eNB sends the second MBMS session update failure message for the unsuccessful outcome to the MCE.

17. The method according to claim 13, further comprising:
at least attempting to process the second feedback message at the MCE;
wherein the first MBMS session update failure message sent from the MCE to the MME is based at least in part on the attempted processing of the second feedback message.

18. The method according to claim 13, wherein, after the MCE receives the second MBMS session update response message for the successful outcome from the eNB, the MCE sends the first MBMS session update response message for the successful outcome to the MME.

19. A method for processing a Multimedia Broadcast/Multicast Service (MBMS) session update in a radio access network (RAN), comprising:
   sending a first MBMS session update request message from a Mobility Management Entity (MME) to a Multi-cell/Multicast Coordination Entity (MCE) via an M3 interface;
   at least attempting to process the first MBMS session update request message at the MCE;
   sending a second MBMS session update request message from the MCE to a base station (eNB) via an M2 interface to provide the eNB with new session attributes based on the processing of the first MBMS session update request message;
   at least attempting to process the second MBMS session update request message at the eNB;
   sending a second MBMS session update failure message from the eNB to the MCE via the M2 interface after the eNB fails to correctly process the second MBMS session update request message, wherein the second MBMS session update failure message reports an unsuccessful outcome of the attempted processing of the second MBMS session update request message; and
   sending a first feedback message from the MCE to the MME via the M3 interface to report an outcome of the attempted processing of the first MBMS session update request message and the unsuccessful outcome of the attempted processing of the second MBMS session update request message, wherein the first feedback message is a first MBMS session update failure message for an unsuccessful outcome.

20. The method according to claim 19, wherein, after the MCE correctly processes the first MBMS session update request message, the MCE sends the first MBMS session update response message for the successful outcome to the MME.

21. The method according to claim 19, further comprising:
   after the MCE receives the second MBMS session update failure message, re-sending the second MBMS session update request message from the MME to the eNB via the M2 interface.

22. The method according to claim 19, further comprising:
   at least attempting to process the second MBMS session update failure message at the MCE;
   wherein the first feedback message sent from the MCE to the MME is based at least in part on the attempted processing of the second MBMS session update failure message.

23. The method according to claim 19, wherein, after the MCE fails to correctly process the first MBMS session update request message due to at least one of determining the RAN is not adapted to the first MBMS session update, an incorrect decoding, and a hardware failure, the MCE sends the first MBMS session update failure message to the MME, the method further comprising:
   after the MME receives the first MBMS session update failure message, re-sending the first MBMS session update request message from the MME to the MCE via the M3 interface.

* * * * *